United States Patent
McSherry et al.

(10) Patent No.: US 7,676,513 B2
(45) Date of Patent: Mar. 9, 2010

(54) SCHEDULING OF INDEX MERGES

(75) Inventors: Frank D. McSherry, San Francisco, CA (US); John P. MacCormick, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 737 days.

(21) Appl. No.: 11/326,884

(22) Filed: Jan. 6, 2006

(65) Prior Publication Data

US 2007/0174314 A1   Jul. 26, 2007

(51) Int. Cl.
*G06F 17/00* (2006.01)
(52) U.S. Cl. .................. 707/616; 707/719; 707/751
(58) Field of Classification Search .......... 707/1, 707/2, 3, 7, 101, 10, 102
See application file for complete search history.

(56) References Cited

U.S. PATENT DOCUMENTS

| | | | | |
|---|---|---|---|---|
| 5,860,107 A | * | 1/1999 | Patel | 711/140 |
| 5,950,186 A | * | 9/1999 | Chaudhuri et al. | 707/2 |
| 6,169,983 B1 | * | 1/2001 | Chaudhuri et al. | 707/2 |
| 6,182,079 B1 | * | 1/2001 | Lenzie | 707/101 |
| 6,266,658 B1 | * | 7/2001 | Adya et al. | 707/2 |
| 6,356,891 B1 | * | 3/2002 | Agrawal et al. | 707/2 |
| 6,513,029 B1 | * | 1/2003 | Agrawal et al. | 707/2 |
| 6,772,141 B1 | * | 8/2004 | Pratt et al. | 707/3 |
| 2005/0108189 A1 | | 5/2005 | Samsonov | 707/1 |
| 2006/0242102 A1 | * | 10/2006 | Bruno et al. | 707/1 |

* cited by examiner

*Primary Examiner*—Charles Rones
*Assistant Examiner*—Rezwanul Mahmood
(74) *Attorney, Agent, or Firm*—Woodcock Washburn LLP

(57) ABSTRACT

While consulting indexes to conduct a search, a determination is made from time to time as to whether it is more efficient to consult individual indexes in a set or to merge the indexes and consult the merged index. The cost of merging indexes is compared with the cost of individually querying indexes. In accordance with the result of this comparison, the indexes are merged and the merged index is consulted, or the indexes are individually consulted. A cost-balance invariant in the form of an inequality is used to equate the cost of merging indexes to a weighted cost of individually querying indexes. As query events are received, the costs are updated. As long as the cost-balance invariant is not violated, indexes are merged and the merged index is queried. If the cost-balance invariant is violated, indexes are not merged, and the indexes are individually queried.

20 Claims, 5 Drawing Sheets

SCHEDULING OF INDEX MERGES

TECHNICAL FIELD

The technical field relates generally to computer systems and more specifically to searching and merging indexes.

BACKGROUND

A common goal of many search systems, such as search engines, is to provide quick and meaningful responses to queries. This typically requires that the searches be conducted efficiently. In an attempt achieve efficient searches, many search engines utilize indexes to facilitate searching. An index maps content (typically in the form of tokens) to the entities being searched (database records, web pages, or the like). For example, a computer system could be used to store text documents and full text indexes could be used to help search the documents. The indexes could map words to lists of document identifiers. The indexes could be used to respond to queries containing one or more words. And a query response would contain a list of all documents containing the words of the query.

Typically, as the number of entities to be searched increases, the size of the index increases. In many cases however, it can be prohibitively inefficient to maintain only one index. For example, the amount of data in an index can become too large to maintain in a processor's internal memory. Many current search systems are continuously queried, and documents are continuously being added thereto. In such systems, as an index becomes too large, it is stored on slower, secondary storage, e.g., disk memory or the like. This results in multiple indexes. Typically, the search system consults each index in response to a query.

Accordingly, as the number of indexes increases, efficiency is affected. Consulting more indexes takes more time. The system can improve efficiency by merging some or all of the indexes into a single index. The operation of merging, however, also takes time. Hence, there is a tension in the system. How can one know, before merging indexes, if it will be more efficient to merge multiple indexes and consult the resultant single index, or individually consult the multiple indexes?

SUMMARY

This Summary is provided to introduce a selection of concepts in a simplified form that are further described below in the Detailed Description Of The Illustrative Embodiments. This Summary is not intended to identify key features or essential features of the claimed subject matter, nor is it intended to be used to limit the scope of the claimed subject matter.

At any appropriate time, the cost of merging indexes is compared with the cost of individually consulting indexes. In accordance with the result of this comparison, if the result of the comparison is within a predetermined range, the indexes are merged and the merged index is consulted for subsequent queries. Otherwise, the indexes are individually consulted. In an exemplary embodiment, a cost-balance invariant is formed balancing the cost of merging indexes to a weighted cost of individually consulting indexes. As query events are received, the costs are updated. As long as the cost-balance invariant is not violated, indexes are merged and the merged index is consulted. If the cost-balance invariant is violated, indexes are not merged, and the indexes are individually consulted.

BRIEF DESCRIPTION OF THE DRAWINGS

The foregoing summary, as well as the following detailed description, is better understood when read in conjunction with the appended drawings. For the purpose of illustrating scheduling of index merges, there is shown in the drawings exemplary constructions thereof; however, scheduling of index merges is not limited to the specific methods and instrumentalities disclosed. In the drawings.

DETAILED DESCRIPTION OF ILLUSTRATIVE EMBODIMENTS

In an attempt to perform queries efficiently, the cost of merging indexes is balanced with the cost of consulting multiple indexes. A cumulative query cost is accrued indicative of the cost of individually consulting indexes in a set of indexes. A cumulative merge cost also is accrued indicative of the cost of merging the indexes in the set. Cost can be based on any appropriate metric, such as time, resource consumption, power, data flow, a number of read/write operations, or a combination thereof, for example. The cumulative merge and query costs are parameters used to populate a cost-balance invariant. The cost-balance invariant is in the form of an inequality, wherein the cumulative merge cost is approximately less than or equal to a weighted value of the cumulative query cost. The cumulative query cost is weighted by a balance function that can comprise any appropriate value and/or function. In an exemplary embodiment, as query events are received, indexes are merged unless the cost-balance invariant is violated. If the cost-balance invariant is violated, the indexes are individually consulted. At this point, a different set of indexes is selected, and the cost-balance invariant analysis is continued as query events are received.

Figure 1:
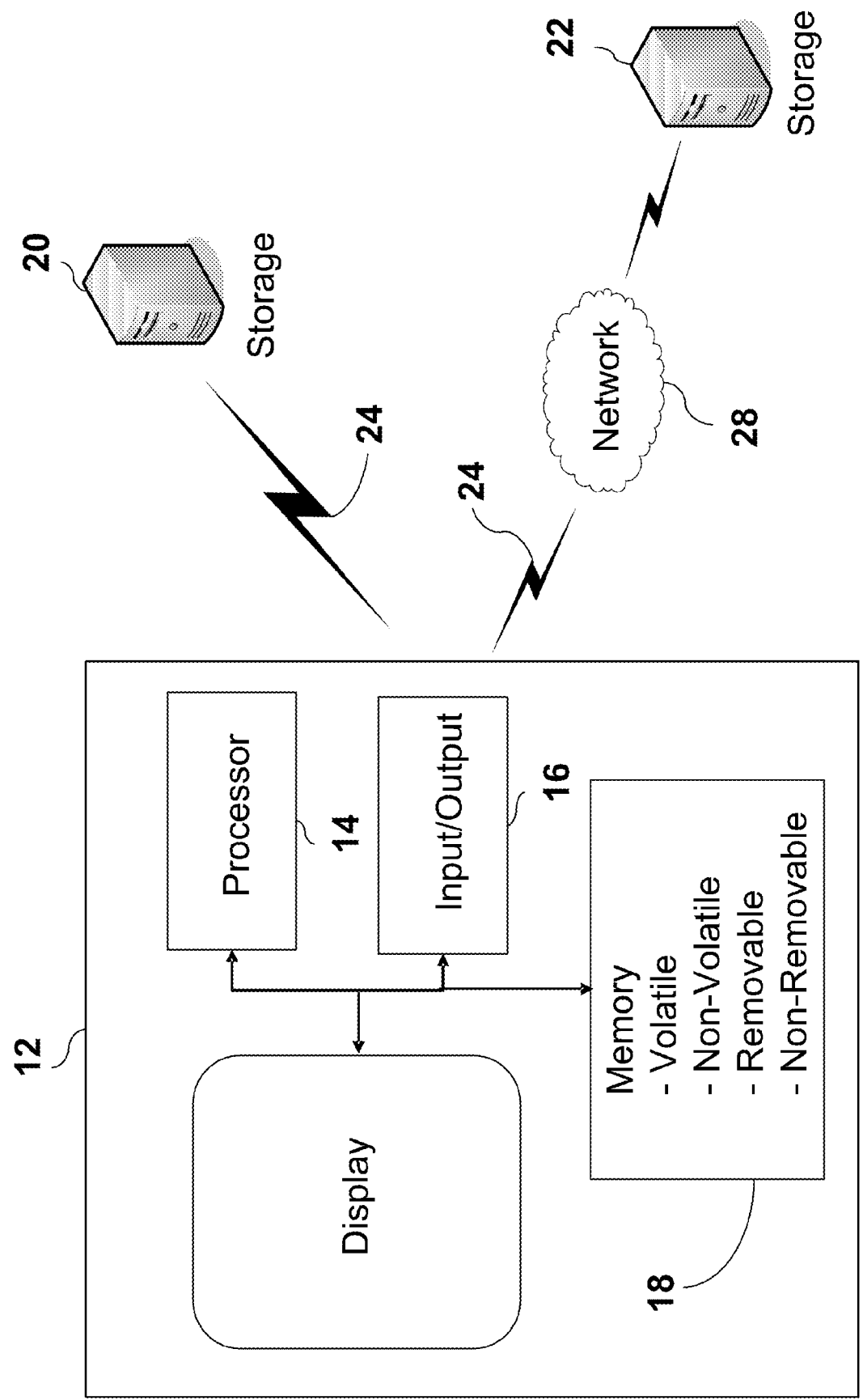
FIG. 1 is a diagram of an exemplary system for scheduling index merges.

FIG. 1 is a diagram of an exemplary system for scheduling index merges comprising a computing device 12. In its most basic configuration, computing device 12 typically includes at least one processing portion 14 and a memory portion 18. Depending upon the exact configuration and type of computing device, memory portion 18 can be volatile (such as RAM), non-volatile (such as ROM, flash memory, etc.) or some combination thereof. Computing device 12 also can include additional features/functionality. For example, computing device 12 also can include additional storage (removable and/or non-removable) including, but not limited to, magnetic or optical disks or tape. Such additional storage is illustrated in FIG. 1 as part of memory 18. Computer storage media includes volatile and nonvolatile, removable and non-removable media implemented in any method or technology for storage of information such as computer readable instructions, data structures, program modules or other data. Memory 18, and any portion thereof, such as removable storage and non-removable storage, can be implemented utilizing computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 12. Any such computer storage media can be part of device 12.

Computing device 12 also can comprise an input/output portion 16 containing communications connection(s) that allow the device to communicate with other devices via interface 24 and/or network 28. Network 28 is coupled to the computing device 12 via interface 24. The interface 24 can comprise a wireless interface, a hard-wired interface, or a combination thereof. The network 28 represents any of a wide variety of data communications networks. The network 28 can include public portions (e.g., the Internet) as well as private portions (e.g., a residential Local Area Network (LAN)), or a combination thereof. The network 28 can be implemented using any one or more of a wide variety of conventional communications media including both wired and wireless media. Any of a wide variety of communications protocols can be used to communicate data via the network 28, including both public and proprietary protocols. Examples protocols include TCPIIP, IPXI SPX, and NetBEUI.

Input/output portion 16 also can comprise and/or utilize communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. Input/output portion 16 also can comprise and/or utilize an input device(s) such as a keyboard, a mouse, a pen, a voice input device, a touch input device, or the like, for example. An output device(s) such as a display, speakers, printer, or the like, for example, also can be included.

Computing device 12 can be coupled to any of a variety of entities via interface 24 and/or network 28. For example, the computing device 12 can be coupled to at least one storage facility. As depicted in FIG. 1, computing device 12 is coupled to storage device 20 via interface 24 and storage device 22 via interface 24 and network 28. These couplings are optional. That is, the computing device 12 can be coupled to storage device 20 via interface 24, or storage device 22 via interface 24 and network 28, or a combination thereof. In an exemplary embodiment, storage device 20 and storage device 22 are the same entity. In another exemplary embodiment, computing device 12 is connected to neither storage device 20 nor storage device 22. Storage devices (20, 22) can comprise a server processor, a client processor, a database, or a combination thereof.

Figure 2:
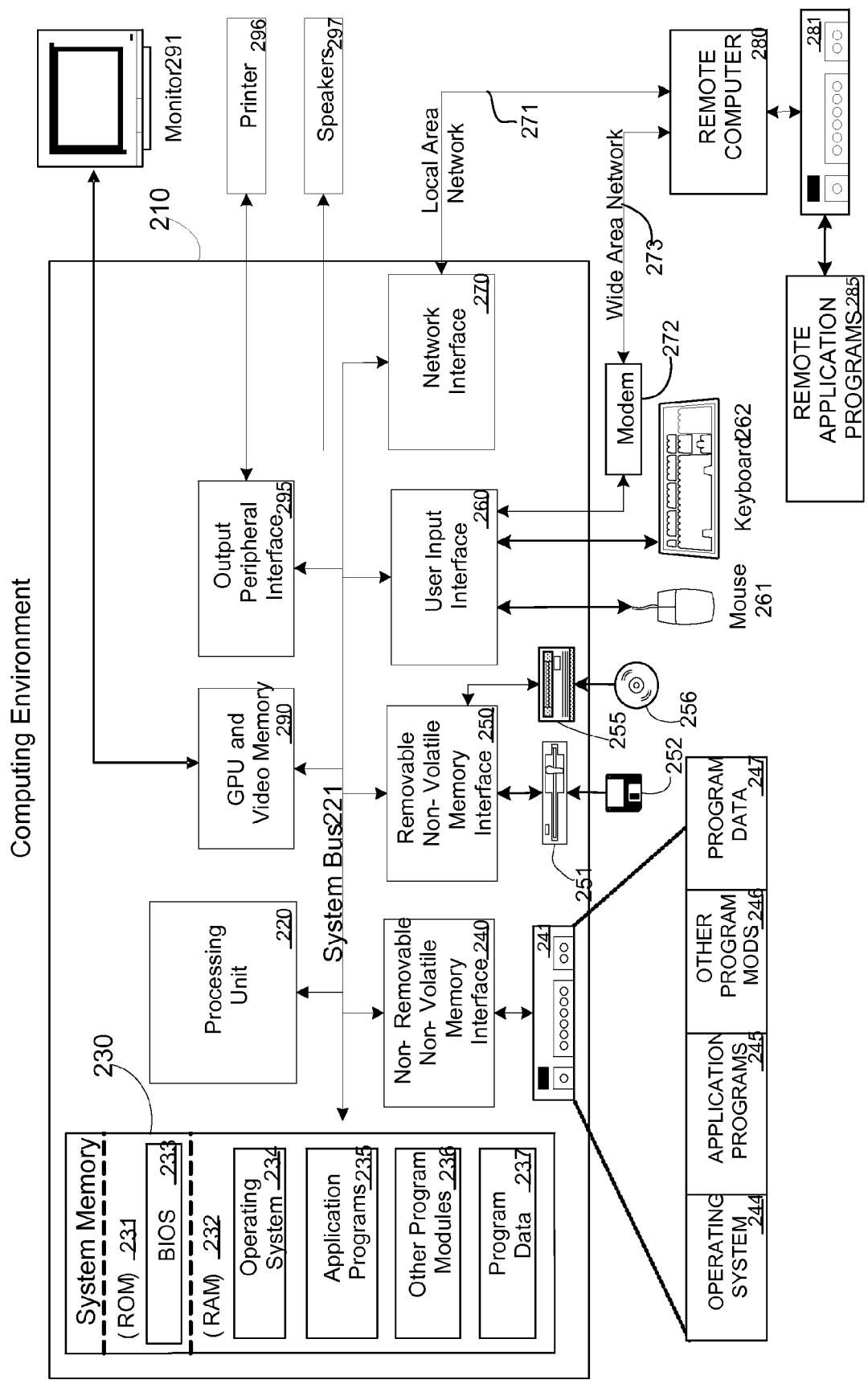
FIG. 2 an exemplary system and operating environment for scheduling index merges.

With reference to FIG. 2, an exemplary system and operating environment for scheduling index merges includes a general purpose computing device in the form of a computer 210. In an exemplary embodiment, the computer 210 is analogous to the computing device 12 of FIG. 1. Components of the computer 210 can include, but are not limited to, a processing unit 220, a system memory 230, and a system bus 221 that couples various system components including the system memory to the processing unit 220. The system bus 221 can be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Additionally, components of the computer 210 can include a memory cache 222. The processing unit 220 can access data from the memory cache 222 more quickly than from the system memory 230. The memory cache 222 typically stores the data most recently accessed from the system memory 230 or most recently processed by the processing unit 220. The processing unit 220, prior to retrieving data from the system memory 230, can check if that data is currently stored in the memory cache 222. If so, a "cache hit" results and the data is retrieved from the memory cache 222 rather than from the generally slower system memory 230.

The computer 210 typically includes a variety of computer readable media. Computer readable media can be any available media that can be accessed by the computer 210 and includes both volatile and nonvolatile media, and removable and non-removable media. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 210. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236 and program data 237. In an exemplary embodiment, applications programs 235 comprise a search engine and means for scheduling index merges.

The computer 210 can also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media, discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246 and program data 247. Note that these components can either be the same as or different from operating system 234, application programs 235, other program modules 236, and program data 237. Operating system 244, application programs 245, other program modules 246, and program data 247 are given different numbers hereto illustrate that, at a minimum, they are different copies. Thus, in an exemplary embodiment, application programs 235 can comprise a programs for conducting searches and programs for scheduling index merges. A user can enter commands and information into the computer 210 through input devices such as a tablet, or electronic digitizer, a microphone, a keyboard 262, and pointing device 261, commonly referred to as a mouse, trackball or touch pad. Other input devices (not shown) can include a joystick, game pad, satellite dish, scanner, or the like. These and other input devices are often connected to the processing unit 220 through a user input interface 260 that is coupled to the system bus, but can be connected by other interface and bus structures, such as a parallel port, game port or a universal serial bus (USB). A monitor 291 or other type of display device is also connected to the system bus 221 via an interface, such as a video interface 290. In an exemplary embodiment, the monitor 291 is analogous to the display depicted in FIG. 1. The monitor 291 can also be integrated with a touch-screen panel or the like. Note that the monitor and/or touch screen panel can be physically coupled to a housing in which the computing device 210 is incorporated, such as in a tablet-type personal computer. In addition, computers such as the computing device 210 can also include other peripheral output devices such as speakers 297 and printer 296, which can be connected through an output peripheral interface 295 or the like.

The computer 210 can operate in a networked environment using logical connections to one or more remote computers, such as a remote computer 280. The remote computer 280 can be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but can also include other networks. Such networking environments are commonplace in offices, enterprise-wide computer networks, intranets and the Internet. For example, the computer 210 can comprise the source machine from which data is being migrated, and the remote computer 280 can comprise the destination machine. Note however that source and destination machines need not be connected by a network or any other means, but instead, data can be migrated via any media capable of being written by the source platform and read by the destination platform or platforms.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which can be internal or external, can be connected to the system bus 221 via the user input interface 260 or other appropriate mechanism. In a networked environment, program modules depicted relative to the computer 210, or portions thereof, can be stored in the remote memory storage device. By way of example, and not limitation, FIG. 2 illustrates remote application programs 285 as residing on memory device 281. In an exemplary embodiment, remote application programs 285 comprise software for conducting searches and software for scheduling index merges. It will be appreciated that the network connections shown are exemplary and other means of establishing a communications link between the computers may be used.

The various techniques described herein can be implemented in connection with hardware or software or, where appropriate, with a combination of both. Thus, the methods and apparatuses for scheduling index merges or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for scheduling index merges. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed in conjunction with developing software utilizing a managed platform registry. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

In an exemplary embodiment, a search mechanism, such as a search engine, is implemented in the computing device 12. When a query is received by the computing device 12, a search is conducted in memory 18 and/or storage device 20 and 22. Storage devices 20 and 22 can represent a database, a plurality of databases, a web page (pages), or any appropriate location to search. For the sake of simplicity, an exemplary scenario is described wherein the search engine searches for text in documents. Queries for documents containing specific words are continuously received. The documents are stored in any combination of storage devices represented by storage device 22. Documents are continuously received and stored. Full text indexes mapping words to the identifiers of the stored documents are created. The indexes are consulted to search for queried words. An index is stored in memory 18. As documents are received, the index stored in memory 18 is updated. At some point, the index becomes so large that it must be stored somewhere other than memory 18. In this exemplary scenario, the index is stored in storage device 20, wherein storage device 20 represent disk memory, a database (databases), or any appropriate storage mechanism for storing indexes.

It is to be understood that this exemplary scenario is presented for the sake of simplicity and that other more general scenarios and embodiments are applicable. For example, any kind of index can be utilized for any kind of data. The data can comprise text documents, documents in general, graphical data, images, video, audio, web pages, or the like, multimedia, or any combination thereof. Queries can be on any type of information, or token, such as graphical data, images, video, audio, web pages, multimedia, or the like, or any combination thereof, for example.

When maintaining full text indexes of dynamic data, as the size of the index increases, using a single index becomes prohibitively inefficient. One reason for this is that index maintenance utilizes random access to the index data, and secondary storage such as magnetic disks often have prohibitively poor performance for random access. Thus, multiple indexes are used. However, the cost of answering a query is proportional to the number of indexes consulted. Thus, indexes are merged in order to reduce the number of indexes. But, merging indexes can be a costly operation. Thus there is a tension between keeping query cost low by performing merges, while keeping merge cost low by not performing merges too frequently. To merge or not to merge, that is the question. In an exemplary embodiment, accounts for each existing index are maintained indicative of each index's historic merge and query costs. The costs are balanced in an attempt to provide efficient searches.

Figure 3:
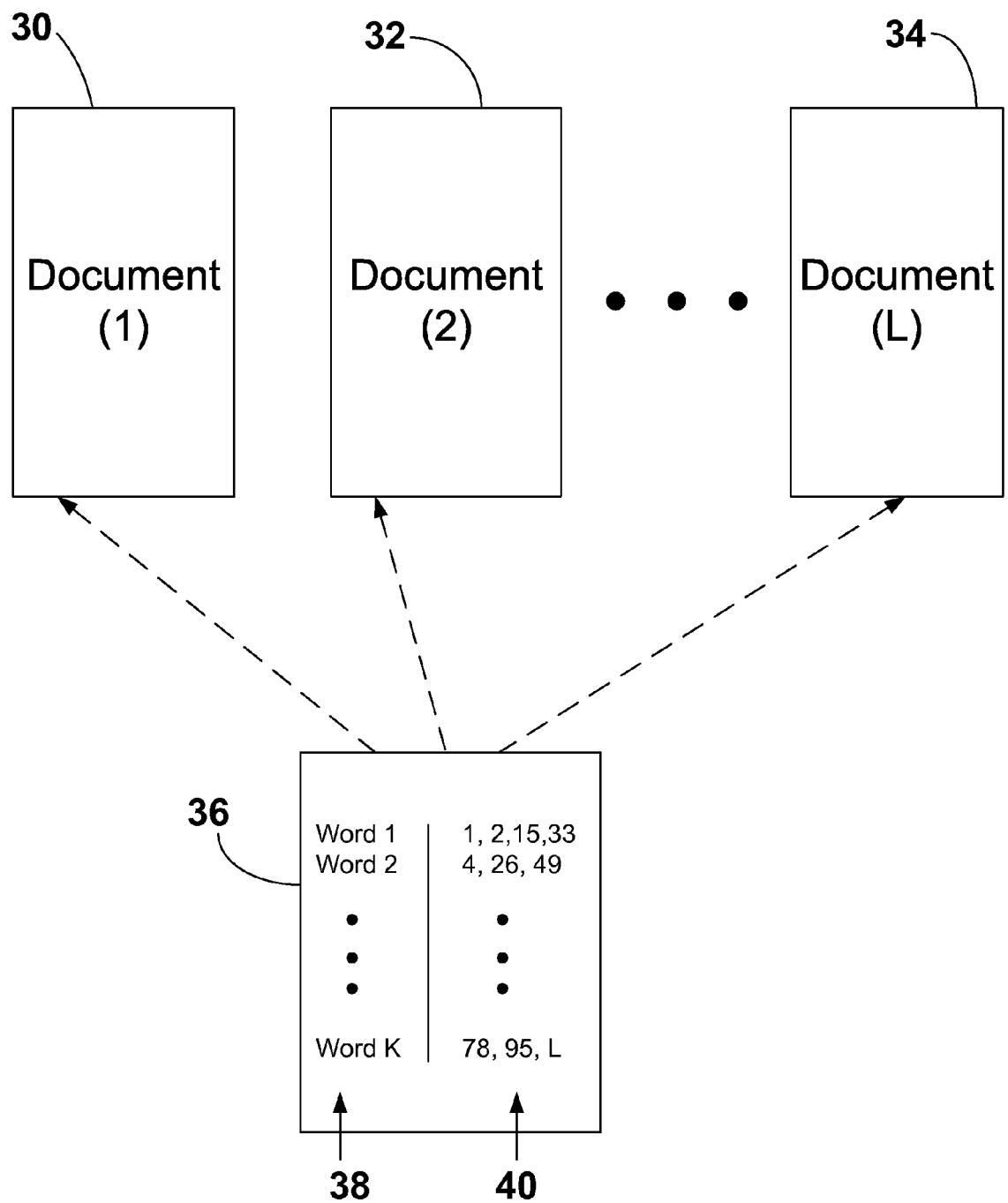
FIG. 3 is an exemplary diagram of an index and documents to which it refers.

FIG. 3 is an exemplary diagram of an index 36 and documents 30, 32, and 34 to which it refers. Index 36 maps words, as depicted in column 38 to identifiers 40 of the documents 30, 32, 34. As shown in FIG. 3, there are L documents, wherein L can represent any appropriate number of documents. Word 1 can be found in document numbers 1, 2, 15, and 33. Word 2 can be found in document numbers 4, 26, and 49, and word 3 can be found in document numbers 78, 95, and L. When a query is received, index 36 is consulted. For example, if a query on word 2 is received, the search system would respond with document numbers 4, 26, and 49, indicating that word 2 can be found in each one of those documents.

As more documents are received, the value of L increases and the size of index 36 increases. The size of index 36 increases because each new document typically contains new words (tokens), and new entries for existing words, which are added to index 36. Eventually, index 36 becomes too large to maintain in the processor's (e.g., computing device 12) memory (e.g., memory portion 18), and is accordingly stored at another location (e.g., storage device 20). This results in multiple indexes that need to be consulted upon a query.

Figure 4:
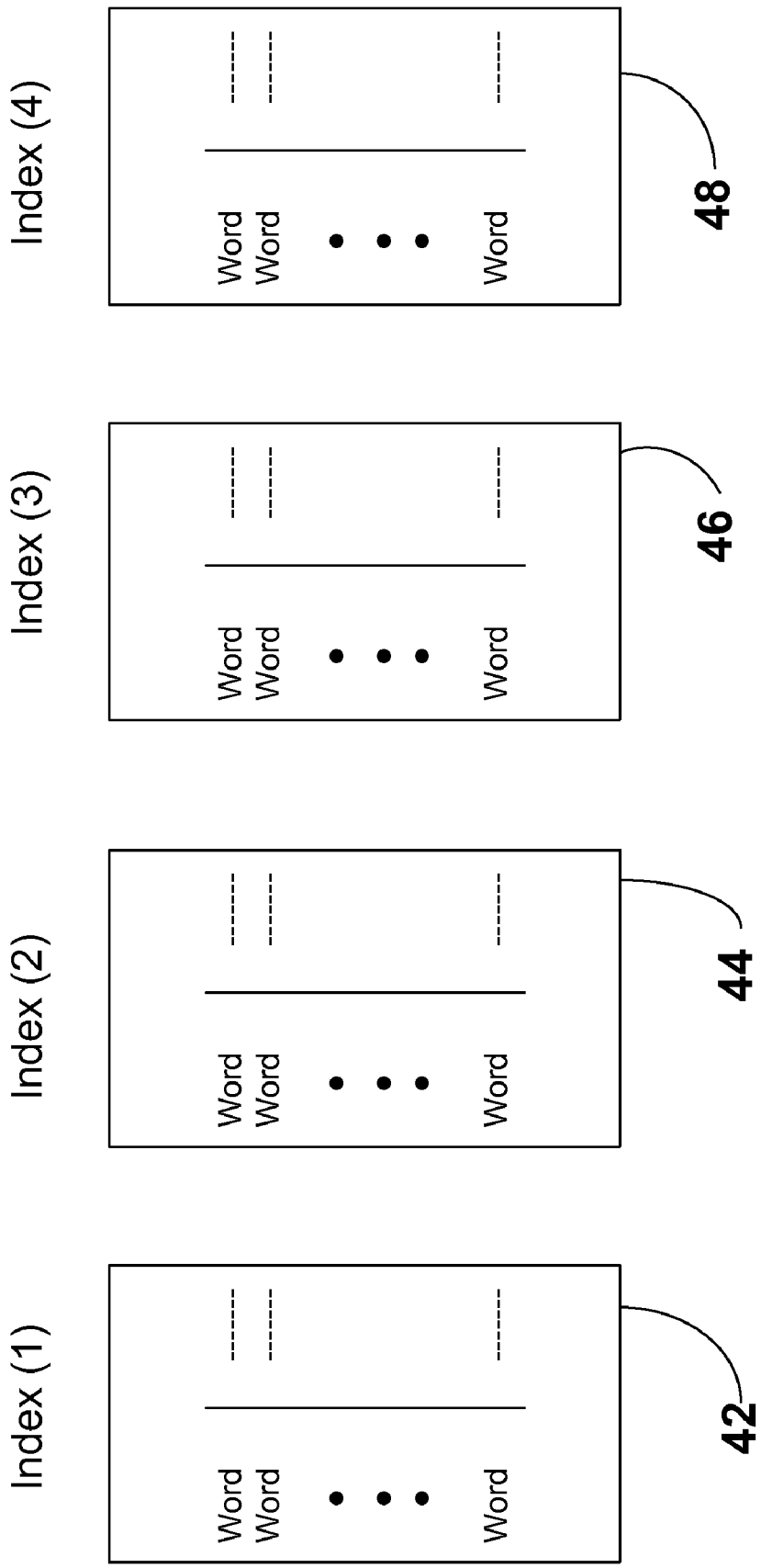
FIG. 4 is a diagram of an exemplary set of indexes.

FIG. 4 is a diagram of an exemplary set of indexes comprising indexes 42, 44, 46, and 48. When a query is received, the search system could consult each one of indexes 42, 44, 46, and 48 separately before returning its answer. Or, at some time prior to receiving the query, the search system could merge indexes 42, 44, 46, and 48, or a subset thereof, and subsequently consult the resultant merged index. There is a cost associated with consulting an index and there is a cost associated with merging indexes. Cost can be determined in accordance with any appropriate measure. For example, cost could be an indication of the amount of time it takes to consult an index, or the amount of time it takes to merge indexes. Cost can be an indication of the number of input/output cycles that are consumed to perform an operation. Cost can be an indication of the number of read and/or write operations performed. Cost can be an indication of the amount of power consumed to perform a merge or consult operation. Or cost can be an indication of any appropriate combination of the foregoing examples. Thus, cost can comprise any appropriate measure used to compare merging indexes with consulting indexes.

In an exemplary embodiment, the cost associated with separately consulting each of the indexes in a set of indexes, summed over the history of the system, is compared with the cost of merging the set of indexes into a single merged index. Thus, referring to FIG. 4, the cost of consulting each of indexes 42, 44, 46, and, 48 is compared to the cost of merging indexes 42, 44, 46, and 48. Each index I has an associated query cost, q(I), indicative of the cost associated with consulting the index I (and its ancestors, if I was itself formed by merging some other indexes) over the history of the system. The query cost of each index can be measured, calculated, estimated, predicted, or a combination thereof. The total query cost, Q, of individually consulting each of a set of indexes having N indexes I is equal to the sum of the individual query costs as depicted in Equation (1) below.

$$Q(I) = \sum_{i=1}^{N} q(I_i) \tag{1}$$

The instantaneous merge cost associated with merging a set of indexes (e.g., 42, 44, 46, and 48) into a single index is designated as C. The cost associated with merging a set of indexes can be measured, calculated, estimated, predicted, or a combination thereof. It is possible that an index can be a result of previously merged indexes. For example, index 42 of FIG. 4 could have been the result of several indexes being previously merged. In an exemplary embodiment, the cost of previous merges is included in the total merge cost. Accordingly, the total cost, M, of merging a set of indexes having N indexes $I_i$ (accounting for all merge costs of the $I_i$ and their ancestors over the history of the system) is equal to the instantaneous cost of merging the individual indexes, C, and the sum of the historic merge costs, $m(I_i)$, as depicted in Equation (2) below.

$$M = \sum_{i=1}^{N} m(I_i) + C \quad (2)$$

In an exemplary embodiment, a cost-balancing invariant is formulated and populated with the merge and query costs. Equation (3) is an exemplary cost-balancing invariant wherein the total cost, M, of merging a set of indexes is less than or equal to the total cost, Q, associated with queries to this set of indexes over the history of the system.

$$M \leq Q \quad (3)$$

In an exemplary embodiment, a weight in the form of a balance function, B, is utilized to facilitate application of the cost-balancing invariant. The balance function, B, can be applied to either side of the inequality of the cost-balancing invariant. In an exemplary embodiment, the balance function, B, is real valued, increasing, multiplier of the total query cost, Q, as depicted in Equation (4) below.

$$M \leq B(Q) \quad (4)$$

The balance function, B, can comprise any appropriate function. For example, the balance function can comprise a constant, the multiplicative identity function, a function of any appropriate cost (e.g., individual query cost, total query cost, historic merge cost, total merge cost), or a combination thereof.

Figure 5:
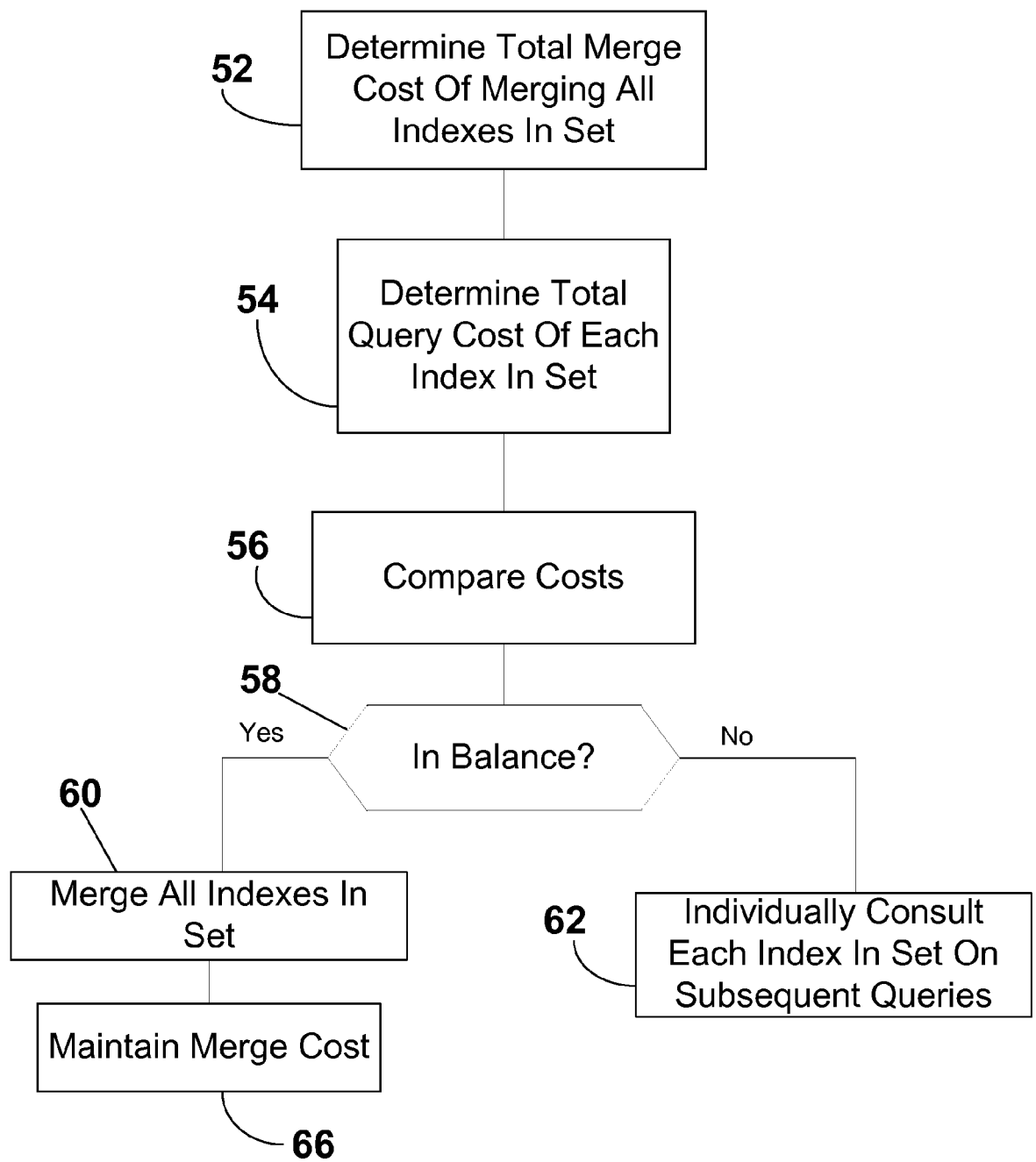
FIG. 5 is a flow diagram of an exemplary process for scheduling index merges.

FIG. 5 is a flow diagram of an exemplary process for scheduling index merges. The cost of merging all indexes in a set of indexes is determined at step 52. This cost, the total merge cost, can be determined in any appropriate manner. The total merge cost can be calculated, estimated, measured, predicted, or a combination thereof. The total merge cost can include the cost of merged indexes in the set. Thus, for example if some of the indexes in a set are the result of previously being merged, the cost associated with the previous merges is included in the determination of the total cost merge. For example, the total merge cost can be determined in accordance with Equation (2). The cost of individually consulting each index in the set is determined at step 54. This cost, the total query cost, can be determined in any appropriate manner. The total query cost can be calculated, estimated, measured, predicted, or a combination thereof. For example, the total query cost, can be determined in accordance with Equation (1). Cost can be based on any appropriate metric, such as time, resource consumption, power, data flow, a number of read/write operations, or a combination thereof, for example.

The total merge cost is compared to the total query cost at step 56. This comparison can be accomplished in any appropriate manner. In an exemplary embodiment, this comparison is accomplished in accordance with a cost-balancing invariant, such as Equation (3) or Equation (4), for example. If the total merge cost and the total query cost are determined to be in balance (step 58), all the indexes in the set are merged at step 60. The cost of this merge is maintained at step 66, so that it can be included in subsequent merge cost determinations. If the total merge cost and the total query cost are determined not to be in balance (step 58), the indexes of the set are not merged, and on subsequent queries will therefore be individually consulted at step 62. In an exemplary embodiment, as long as the total merge cost is less than or equal to the total query cost (optionally weighted, such as being multiplied by a balance function), the indexes of the set are merged and the resultant merged index is consulted on subsequent queries.

A set of indexes can be selected in any appropriate manner. For example, a set can be randomly selected from a plurality of indexes, a set can be selected in order of size, a set can be selected in order of creation time, a set can be selected from contiguous indexes (as stored in memory), or a combination thereof. In an exemplary embodiment, the smallest (e.g., memory consumption) indexes are selected to form a set. The number of indexes to form the set can be any appropriate number. The number can be predetermined, or be dynamically determined in accordance with system requirements. As a set is merged, a new set is formed from the smallest indexes.

As described above, while exemplary embodiments of a scheduling index merges have been described in connection with various computing devices, the underlying concepts can be applied to any computing device or system capable of scheduling index merges. The various techniques described herein can be implemented in connection with hardware or software or, where appropriate, with a combination of both. Thus, the methods and apparatus for scheduling index merges, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for scheduling index merges.

In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations. The methods and apparatuses for a scheduling index merges also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of scheduling index merges. Additionally, any storage techniques used in connection with a scheduling index merges can invariably be a combination of hardware and software. While scheduling index merges has been described in connection with the exemplary embodiments of the various figures, it is to be understood that other similar embodiments can be used or modifications and additions can be made to the described embodiments for performing the same functions of scheduling index merges without deviating therefrom. Therefore, scheduling index merges as described herein should not be limited to any single embodiment, but rather should be construed in breadth and scope in accordance with the appended claims.

What is claimed:

1. A computer implemented method for scheduling an index merge, said method comprising:
   determining a total query cost indicative of individually consulting each index in a set of indexes, wherein determining the total query cost comprises determining a historic query cost associated with querying a first index prior to the first index being merged into an ancestral index, and adding the historic query cost of the first index to estimated query costs for a plurality of other indexes in the set of indexes;

determining a total merge cost indicative of merging said set of indexes into a single merged index, wherein determining the total merge cost comprises determining a historic merge cost associated with merging the first index into the ancestral index, and adding the historic merge cost of the first index to estimated merge costs for the plurality of other indexes in the set of indexes;

comparing said total merge cost with said total query cost; and depending upon a result of said comparison, performing one of: a) merging said set of indexes into a merged index and maintaining said merge cost, or b) individually consulting each index in said set.

2. The method in accordance with claim 1, wherein said act of comparing comprises determining if said total merge cost is less than or equal to said total query cost.

3. The method in accordance with claim 2, wherein if said total merge cost is less than or equal to said total query cost, performing acts of:
merging said set of indexes into said merged index; and
consulting said merged index.

4. The method in accordance with claim 2, wherein if said total merge cost is greater than said total query cost, individually consulting each index in said set.

5. A computer-readable storage medium having computer-executable instructions for merging a set of indexes, wherein each index in the set of indexes is indicative of information contained in at least one document, said computer-executable instructions configured for:

determining a total query cost, the determination comprising determining a historic query cost for at least one of a plurality of ancestral indexes present in a first index in the set of indexes, wherein the first index has been formed by merging the plurality of ancestral indexes, and wherein the historic query cost is associated with querying the at least one of a plurality of ancestral indexes prior to forming of the first index;

determining a total merge cost indicative of merging said set of indexes into a single merged index, wherein determining the total merge cost comprises determining a historic merge cost associated with merging the at least one of a plurality of ancestral indexes into the first index;

comparing said total merge cost with said total query cost; and dependent upon a result of said comparison, merging said set of indexes and maintaining said merge cost.

6. The computer-readable storage medium in accordance with claim 5, wherein:
said act of comparing comprises determining if said total merge cost is less than or equal to said total query cost;
if said total merge cost is less than or equal to said total query cost, merging said set of indexes and using the merged index for consulting; and
if said total merge cost is greater than said total query cost, individually consulting each index in said set of indexes.

7. The computer-readable storage medium in accordance with claim 5, wherein said act of comparing comprises determining if said total merge cost is less than or equal to a product of a weight and said total query cost.

8. The computer-readable storage medium in accordance with claim 5, wherein:
said total merge cost is a function of at least one of time, power, and resource consumption; and
said total query cost is a function of at least one of time, power, and resource consumption.

9. The computer-readable storage medium in accordance with claim 5, wherein:
said total query cost is indicative of a sum of respective query costs associated with each index in said set; and
said total merge cost is indicative of a sum of:
a cost of merging all indexes in said set; and
respective merge costs for each merged index in said set.

10. A system for scheduling an index merge, said system comprising:
a storage device; and
a processor coupled to the storage device, the processor configured for:
determining a total query cost for querying a set of indexes stored in said
storage device, the determination comprising:
determining a historic query cost for at least one of a plurality of ancestral indexes present in a first index in the set of indexes, wherein the first index has been formed by merging the plurality of ancestral indexes, and wherein the historic query cost is associated with querying the at least one of a plurality of ancestral indexes prior to forming of the first index;
determining a total merge cost indicative of merging said set of indexes into a single merged index, wherein determining the total merge cost comprises determining a historic merge cost associated with merging the at least one of a plurality of ancestral indexes into the first index;
comparing said total merge cost with said total query cost; and
dependent upon a result of said comparison, merging said set of indexes into a merged index and maintaining said merge cost.

11. The system in accordance with claim 10, wherein said act of comparing comprises determining if said total merge cost is less than or equal to said total query cost.

12. The system in accordance with claim 10, wherein said act of comparing comprises determining if said total merge cost is less than or equal to a product of a weight and said total query cost.

13. The system in accordance with claim 10, wherein:
said total merge cost is a function of at least one of time, power, and resource consumption; and
said total query cost is a function of at least one of time, power, and resource consumption.

14. The method in accordance with claim 1, wherein the total merge cost is defined as a sum of the historic merge cost and an instantaneous merge cost.

15. The method in accordance with claim 1, wherein the set of indexes is randomly selected from a plurality of indexes.

16. The method in accordance with claim 1, wherein the set of indexes is selected from a plurality of contiguously stored indexes.

17. The method in accordance with claim 1, wherein the set of indexes is i) dynamically selected based on system requirements or ii) selected based on an order of creation of individual indexes.

18. The method in accordance with claim 1, wherein the total query cost is calculated over the history of a system, and compared thereafter with the total merge cost to determine a desirability for scheduling the index merge.

19. The method in accordance with claim 1, wherein said total query cost is defined by a first equation $$Q(I) = \sum_{i=1}^{N} q(Ii)$$

wherein Q(I) is said total query cost of individually querying said set of indexes having N indexes $I_i$.

20. The method in accordance with claim 19, wherein said total merge cost is defined by a second equation $$M = \sum_{i=1}^{N} m(Ii) + C$$

wherein M is said total merge cost that is equal to said historic merge cost m(Ii,) and said estimated merge costs C for the plurality of other indexes.

* * * * *